Patented Dec. 30, 1924.

1,521,537

UNITED STATES PATENT OFFICE.

HARRY W. HOUGHTON, OF GLEN ECHO, MARYLAND.

FUMIGANT AND PROCESS OF FUMIGATION.

No Drawing.  Application filed June 21, 1924. Serial No. 721,565.

*To all whom it may concern:*

Be it known that I, HARRY W. HOUGHTON, a citizen of the United States, residing at Glen Echo, county of Montgomery, State of Maryland, have invented an Improvement in Fumigants and Processes of Fumigation, for which I made application for Letters Patent of the United States on December 5, 1922, and have invented certain improvements therein, of which the following description is a specification.

This invention relates to an improved fumigant and process of fumigation.

Heretofore, the principal fumigants used have been hydrocyanic acid, carbon monoxide and sulphur dioxide. All of these possess the necessary lethal quality, sulphur dioxide in a lesser degree than the other two, but their use is open to serious objections. The odor of hydrocyanic acid is relatively slight and carbon monoxide is odorless and neither of these gases possesses any other warning characteristic. They are therefore extremely dangerous to human beings and many casualties have occurred in their use as fumigants. Furthermore, hydrocyanic acid is not very readily diffusible, is liable to collect and remain in poorly ventilated spaces, and in cold spaces is liable to condense and then be volatilized when such spaces become heated hours or even days later, so that persons entering such spaces a considerable period after fumigation had been effected have been overcome without warning. Carbon monoxide requires such complicated apparatus for its generation that its use is greatly restricted and this gas furthermore is valueless for the destruction of the lower forms of animal life, such as fleas, flies, mosquitoes, etc., even after long exposure and in a highly concentrated state.

Sulphur dioxide is of relatively low toxic quality and diffusibility so that it is necessary to prolong the period of fumigation, which makes its use undesirable and often impracticable. Even then, owing to its low diffusibility and lack of penetration, animals concealed in pockets or spaces between packages are liable to escape the effect of this gas. In the presence of dampness sulphur dioxide also forms an acid which injures tissues, articles of clothing, foodstuffs, seeds, etc.

Experiments have also been made looking toward the use as a fumigant of a mixture of hydrocyanic acid gas and formaldehyde. While the formaldehyde possesses a certain warning quality it has been found in practice that the mixture of the hydrocyanic acid gas and the formaldehyde does not act as a single gas, the mixture not continuing until both are dissipated, but on the contrary it has been found that the hydrocyanic acid gas and formadehyde separate and stratify, and that the formaldehyde is more rapidly dissipated than the hydrocyanic acid gas so that the latter is liable to persist in lethal concentrations after the formaldehyde has been dissipated, and persons entering places fumigated with this mixture are liable to be overcome, the fumigant having lost its warning quality.

The fumigant in accordance with the present invention is free from the above objections. It consists of a gas combining the necessary lethal quality with a warning quality so manifest and unmistakable that the presence of the fumigant, even in non-lethal concentrations, must be immediately detected by any human being and will in fact make it impossible for the human being to remain in the presence of the fumigant because its lachrymatory effect is unbearable. For the formation of such a gas I preferably use a mixture of hydrocyanic acid and a cyanogen haloid, preferably cyanogen chloride. While the proportions may vary considerably according to the special conditions under which the fumigant is to be used I generally use a mixture containing approximately 25% of hydrocyanic acid and 75% of cyanogen chloride. In this mixture the cyanogen chloride is the warning gas owing to its lachrymatory property, and the use of this gas as the warning agent has the added advantage that this gas is also lethal and equally effective (and perhaps more so than the hydrocyanic acid in some cases, particularly bacteria and eggs of animals and insects) in the extermination of animal and insect pests, such as rats, bats, bedbugs, roaches, mosquitoes, flies, fleas and lice, and bacteria, including disease germs.

The lachrymatory effect of the above mentioned mixture of hydrocyanic acid and cyanogen chloride, due to the presence of the latter, is so severe, even in non-lethal concentration, that human beings cannot remain in the presence of the mixture but are obliged to retreat at once so that the fatalities so frequently produced in the past by the employment of the fumigants heretofore used are quite impossible.

It has been found in practice that the gaseous mixture produced and utilized in accordance with this invention resembles one gas, there being no separation of the two gases during the dissipation, the two gases constituting the mixture not stratifying but remaining as a substantially perfect mixture. It is also found that the gaseous mixture constituting this invention is dissipated very rapidly by ventilation, and the cyanogen chloride gas is not dissipated more rapidly than the hydrocyanic acid gas so that the fumigant retains its warning quality until all the hydrocyanic acid gas has been dissipated, and persons entering spaces which have been fumigated with this fumigant will receive full warning until after all danger is passed. This fumigant is also non-corrosive to metals, and non-injurious to fabrics and other substances, including plant life; it is easily manufactured, of low cost and free from danger of explosion and fire if proper proportions of the ingredients are used. Besides being destructive to animal life, this fumigant is an efficient germicide, insecticide and disinfectant.

In practicing the invention it is preferable to generate the gas mixture at the place where it is to be used, that is to say, within the spacees to be fumigated or near the plants, trees or other objects that are to be reached. A mineral acid, preferably concentrated hydrochloric acid diluted with an equal volume of water, is placed in an open vessel and to this acid there is added a mixture of a water soluble cyanide and a water soluble oxidizing agent, preferably a chlorate. It is preferred to use dilute hydrochloric acid instead of the concentrated hydrochloric acid so as to avoid the formation of objectionable oxides of chlorine which are highly inflammatory or explosive. It is also preferred to use the cyanides and chlorates of the alkali metals, owing to their cheapness and ready availability. They may be dissolved in water or used dry.

If used dry, preferably they are supplied in the form of coarse granules, so as to avoid hazards of fire and explosion to which mixtures of the finely powdered materials are subject. These hazards may be largely overcome by coating the chlorate with some inert substance or material, for example a silicate, such as powdered talc; the proportion of talc may be approximately 25% in weight of the entire mixture. This coating of the chlorate with an inert substance or material may be applied to the coarse granules as well as to the powdered chlorate and will promote safety in storing, transportation and handling of mixtures of cyanide and chlorate.

The cyanogen chloride and hydrocyanic acid gas are generated, preferably by a continuous reaction involving the liberation of nascent chlorine in an aqueous solution of a cyanide salt acidified with hydrochloric acid, the said chlorine in this specific case being liberated from an oxidizing reagent like a chlorate of an alkali metal, preferably sodium or potassium chlorate. The ingredients may, as already stated, be used in different proportions according to circumstances. The following proportions have been found in practice to be very satisfactory: For every 1000 cubic feet of space use from one to five ounces of sodium or potassium cyanide; from one to four ounces of potassium chlorate; and from 100 to 600 cubic centimeters (3 to 20 fluid ounces) of concentrated commercial hydrochloric acid diluted with an equal quantity of water. In other cases I have used about four ounces of sodium or potassium cyanide to about two ounces of sodium or potassium chlorate and 17 fluid ounces of concentrated commercial hydrochloric acid diluted with an equal amount of water, but as already stated the proportions may vary.

The reaction may be expressed by the following equations, depending upon the proportions of the ingredients used, as indicated by the subtended atomic weights;

(1) $3NaCN+NaClO^3+7HCl=4NaCl+HCN+2NCCl+Cl^2+$
    $3H^2O 147.18+106.50+255.15=234+27.01+122.92+70.90+54$
(2) $4NaCN+NaClO^3+7HCl=5NaCl+HCN+3NCCl+$
    $3H^2O 196.24+106.50+255.15=292.5+27.01+184.38+54.$

The amounts of hydrocyanic acid gas and free chlorine evolved will depend somewhat upon the nature of the ingredients, the surrounding temperature, and other conditions subject to fluctuation, as well as upon the proportions of the ingredients used.

The sodium or potassium cyanide and sodium or potassium chlorate may be dissolved in water equal in volume to the concentrated hydrochloric acid, or they may be mixed in a cloth bag which may then be dropped into the dilute hydrochloric acid. Generation of the fumigant then takes place, starting slowly and with cyanogen chloride predominating. The fumigant thus generated contains about 25% of hydrocyanic acid gas and about 75% of cyanogen chloride gas, in addition to some free chlorine.

In conducting the fumigation the ingredients should be ready and at the place of operation. The operator may use a gas mask, but this is not absolutely necessary owing to the warning characteristic of the fumigant, even in non-lethal concentrations. Usually about an hour's exposure of the space to be fumigated to the action of the fumigant will suffice to produce the desired effect and at the end of this period the operator, wearing a mask, opens the windows, doors or covers, whereupon dissipation of the fumigant occurs very rapidly, the hydrocyanic acid gas and cyanogen chloride gas dissipating together, the cyanogen chloride gas remaining so long as there remains any hydrocyanic acid gas, the lachrymatory effect thus persisting so long as there is any hydrocyanic acid gas present, so that when the lachrymatory effect has disappeared one may be sure that all hydrocyanic acid has also disappeared and that all danger to human life has passed.

This fumigant is also valuable as a sterilizer and germicide. As a sterilizer, germicide and insecticide for plants, trees and vegetation in general the fumigant may be dissolved in water which is then used as a spray. The fumigant is readily soluble in water which absorbs anywhere from one to 25 parts of the fumigant to one part of water. Bugs, insects, germs or bacteria will be destroyed by this spray which retains its effectiveness for three or four hours, and in proper concentration is not injurious to plant life. The strength of the spray can readily be regulated according to the plant life to be treated. Here again the lachrymatory effect of the fumigant persists until all hydrocyanic acid gas has been dissipated so that all danger to human life is avoided.

Another advantage of this fumigant is that it is not retained by foods, tests made with foods which had been fully exposed to the action of the fumigant in spaces during fumigation showing that these foods were absolutely free from the fumigant. Milk, for example, the absorbent qualities of which for gases is well known, and which had been fully exposed to the action of the fumigant in spaces fumigated, was tested by being fed to rats and mice without any apparent effect whatever upon these. Milk thus exposed was also consumed by human beings with impunity, there being neither taste nor odor of the fumigant left therein.

The foregoing description is believed to be sufficiently comprehensive to enable the manner of practicing the invention for the various purposes illustrated to be fully understood, but the invention is obviously applicable to all kinds of fumigation, including by this term the extermination of pests of all kinds, the destruction of disease germs, and checking processes of decay caused by bacteria.

What I claim as my invention and desire to secure by Letters Patent is:

1. A fumigant containing hydrocyanic acid gas and a warning lachrymatory cyanogen derivative gas having greater specific gravity than air, which combine to form a permanent gas mixture heavier than air diffusing and dissipating without separation.

2. A fumigant containing hydrocyanic acid gas and a cyanogen haloid in proportions to combine to form a substantially permanent gas.

3. A fumigant containing hydrocyanic acid gas and cyanogen chloride in predominant lachrymatory proportions.

4. A fumigant containing hydrocyanic acid gas and a cyanogen haloid in proportions to form a substantially permanent gas freely soluble in water.

5. A fumigant containing hydrocyanic acid gas and cyanogen chloride generated simultaneously.

6. A fumigant produced by the simultaneous generation of cyanogen haloides and hydrocyanic acid gas.

7. A fumigant resulting from the evolved gaseous reaction of a cyanide, a chlorate and hydrochloric acid.

8. A fumigant produced by the generation of cyanogen chloride and hydrocyanic acid gas by liberating nascent chlorine in an aqueous solution of a cyanide acidified by hydrochloric acid.

9. A fumigant produced by the generation of cyanogen chloride and hydrocyanic acid gas by liberating nascent chlorine in an aqueous solution of a cyanide and an oxidizing agent acidified by hydrochloric acid.

10. A fumigant produced by generating cyanogen chloride and hydrocyanic acid gas by liberating nascent chlorine in an aqueous solution of a cyanide acidified with hydrochloric acid by the addition of a chlorate compound.

11. A fumigant produced by generating cyanogen chloride and hydrocyanic acid gas by liberating nascent chlorine in an aqueous solution of a cyanide acidified with hydrochloric acid by the addition of a chlorate compound protectively coated with a substance inert to the action of the acid.

12. A fumigant produced by generating cyanogen chloride with hydrocyanic acid gas by liberating nascent chlorine in an aqueous solution of a cyanide acidified with hydrochloric acid by the addition of a chlorate compound protectively coated with a silicate compound.

13. A fumigant produced by generating cyanogen chloride and hydrocyanic acid gas by liberating nascent chlorine in an aqueous solution of a cyanide acidified with hydrochloric acid by the addition of a chlorate compound protectively coated with talc.

14. A fumigant produced by generating cyanogen chloride and hydrocyanic acid gas by liberating nascent chlorine in an aqueous solution of a cyanide acidified with hydrochloric acid by the addition of a chlorate compound in subordinate amount to produce a permanent gas, heavier than air, diffusing and dissipating without separation.

15. A fumigant resulting from the evolved gaseous reaction of a cyanide in major proportion and a chlorate in lesser proportion mixed with several times the amount of hydrochloric acid and water in equal proportions.

16. A fumigant comprising a plurality of gases, one of which is hydrocyanic acid gas and one of which is cyanogen haloid in proportions to form a gaseous combine having a greater specific gravity than air.

17. A fumigant comprising a warning lachrymatory and lethal cyanogen derivative gaseous combine heavier than air, soluble in water and diffusing and dissipating freely without separation.

18. A mixture of a cyanide and an oxidizing agent, the latter being coated with talc or some other inert substance, for the purpose described.

19. A mixture of sodium cyanide and a chlorate in which the particles of the latter are coated with talc or some other inert substance for the purpose described.

20. A mixture containing sodium cyanide and sodium chlorate in which the particles of sodium chlorate are coated with talc or some other inert substance, the proportions being such as to cause liberation of hydrocyanic acid gas and cyanogen chloride when acted upon by hydrochloric acid.

In testimony whereof, I have signed my name to this specification.

HARRY W. HOUGHTON.